US012039705B2

(12) United States Patent
Jeong et al.

(10) Patent No.: US 12,039,705 B2
(45) Date of Patent: Jul. 16, 2024

(54) METHOD AND APPARATUS FOR CLASSIFYING FAKE IMAGES

(71) Applicants: SAMSUNG SDS CO., LTD., Seoul (KR); CHUNG ANG University industry Academic Cooperation Foundation, Seoul (KR)

(72) Inventors: Yong Hyun Jeong, Seoul (KR); Jong Won Choi, Seoul (KR); Do Yeon Kim, Seoul (KR); Young Min Ro, Seoul (KR)

(73) Assignees: CHUNG ANG University Industry Academic Cooperation Foundation, Seoul (KR); SAMSUNG SDS CO., LTD., Seoul (KR)

(*) Notice: Subject to any disclaimer, the term of this patent is extended or adjusted under 35 U.S.C. 154(b) by 404 days.

(21) Appl. No.: 17/526,151

(22) Filed: Nov. 15, 2021

(65) Prior Publication Data

US 2022/0156897 A1    May 19, 2022

(30) Foreign Application Priority Data

Nov. 13, 2020   (KR) .................. 10-2020-0151982
Nov. 11, 2021   (KR) .................. 10-2021-0155040

(51) Int. Cl.
G06T 5/00    (2024.01)
G06N 3/045   (2023.01)
G06T 5/77    (2024.01)

(52) U.S. Cl.
CPC .............. G06T 5/77 (2024.01); G06N 3/045 (2023.01); *G06T 2207/20081* (2013.01); *G06T 2207/20084* (2013.01)

(58) Field of Classification Search
CPC ............ G06T 5/77; G06T 2207/20081; G06T 2207/20084; G06N 3/045; G06N 3/08; G06V 10/82
See application file for complete search history.

(56) References Cited

U.S. PATENT DOCUMENTS

| | | | |
|---|---|---|---|
| 2016/0027153 A1* | 1/2016 | Eun ........................... | G06T 5/10 |
| | | | 382/131 |
| 2018/0357500 A1* | 12/2018 | Lin ........................... | G06T 7/70 |
| 2019/0197358 A1* | 6/2019 | Madani ..................... | G06N 3/045 |
| 2019/0236614 A1* | 8/2019 | Burgin ..................... | G06V 10/764 |
| 2020/0160502 A1* | 5/2020 | Nießner .................... | G06V 10/431 |
| 2021/0117650 A1* | 4/2021 | Ye ............................. | G06T 7/97 |
| 2023/0116801 A1* | 4/2023 | Yao .......................... | G06V 10/26 |
| | | | 382/157 |

FOREIGN PATENT DOCUMENTS

KR    10-1975186 B1    5/2019

* cited by examiner

*Primary Examiner* — Van D Huynh
(74) *Attorney, Agent, or Firm* — Sughrue Mion, PLLC

(57) ABSTRACT

An apparatus for classifying fake images according to an embodiment of the present disclosure includes an artifact remover configured to receive an input image to generate an artifact-removed image from which artifacts are removed, an artifact image generator configured to generate an artifact image by using a difference between the input image and the artifact removal image, and a determiner configured to determine whether the artifact image is a real image or a fake image by receiving the artifact image.

10 Claims, 4 Drawing Sheets

METHOD AND APPARATUS FOR CLASSIFYING FAKE IMAGES

CROSS-REFERENCE TO RELATED APPLICATION(S)

This application claims priority to Korean Patent Application Nos. 10-2020-0151982 filed on Nov. 13, 2020 and 10-2021-0155040 filed on Nov. 11, 2021, in the Korean Intellectual Property Office (KIPO), the entire disclosure of which is incorporated by reference herein.

BACKGROUND

1. Field

The following description relates to a technology for classifying fake images.

2. Description of Related Art

Research fields for deepfake image detection technology mainly include image-based detection and frequency-based detection. The image-based detection model learns pixel level artifacts existing in a fake image, and the detection performance thereof largely depends on the domain of training data, accordingly.

On the other hand, for the frequency-based detection that converts an image into a frequency domain and performs detection based on artifacts of high-frequency elements exhibiting features of fake images, the dependence on training data may be relatively reduced as compared with the image-based detection, which may suppress a rapid deterioration in the detection performance. However, even in the case of frequency-based detection, the detection performance still deteriorates when the forgery method differs from the training data in the image category, generation model, and brightness property, or the like, and this is called a "generalization issue".

SUMMARY

The disclosed embodiments are intended to provide a method and apparatus for classifying fake images.

In one general aspect, there is provided an apparatus for classifying fake images including an artifact remover configured to receive an input image to generate an artifact-removed image from which artifacts are removed, an artifact image generator configured to generate an artifact image by using a difference between the input image and the artifact-removed image, and a determiner configured to determine whether the artifact image is a real image or a fake image by receiving the artifact image.

The artifact remover may include an artifact-removed image generator configured to generate an artifact-removed image from the input image by using an artificial neural network trained to remove artifacts of the input image in a frequency domain, and an artifact-removed image determiner configured to be trained to determine whether the artifact-removed image is a real image or a fake image.

The artifact-removed image generator may be further configured to convert the input image into a frequency domain to generate a converted image, remove artifacts from the converted image by using the artificial neural network, and generate an artifact-removed image by converting the artifact-removed converted image into an image domain.

The artifact-removed image generator and the artifact-removed image determiner may constitute a generative adversarial network (GAN).

The artifact-removed image generator may be further configured to be trained based on an adversarial loss function defined so that an artifact-removed image of a real input image and an artifact-removed image of a fake input image are similar, and a normalized loss function defined so that the artifact-removed image of the real input image is similar to the real input image and the artifact-removed image of the fake input image is made close to zero.

The determiner may include a first determiner configured to determine whether an image is a real image or a fake image based on the artifact image, and a second determiner configured to convert the artifact image into a frequency domain and then determines whether the converted image is a real image or a fake image.

In another general aspect, there is provided a method for classifying fake images including removing artifacts by receiving an input image to generate an artifact-removed image from which the artifacts are removed, generating an artifact image by using a difference between the input image and the artifact-removed image, and determining whether the artifact image is a real image or a fake image by receiving the artifact image.

The removing of the artifacts may include generating the artifact-removed image from the input image by using an artificial neural network trained to remove artifacts of the input image in a frequency domain, and determining whether the artifact-removed image is a real image or a fake image.

The generating of the artifact-removed image may include generating a converted image by converting the input image into a frequency domain, removing artifacts from the converted image by using the artificial neural network, and generating the artifact-removed image by converting the artifact-removed converted image into an image domain.

The generating of the artifact-removed image and the determining of the artifact-removed image may constitute a generative adversarial network (GAN).

The artificial neural network may be trained based on an adversarial loss function defined so that an artifact-removed image of a real input image and an artifact-removed image of a fake input image are similar, and a normalized loss function defined so that the artifact-removed image of the real input image is similar to the real input image and the artifact-removed image of the fake input image is made close to zero.

The determining may include determining whether an image is a real image or a fake image based on the artifact image, and converting the artifact image into a frequency domain and then determining whether the converted image is a real image or a fake image.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
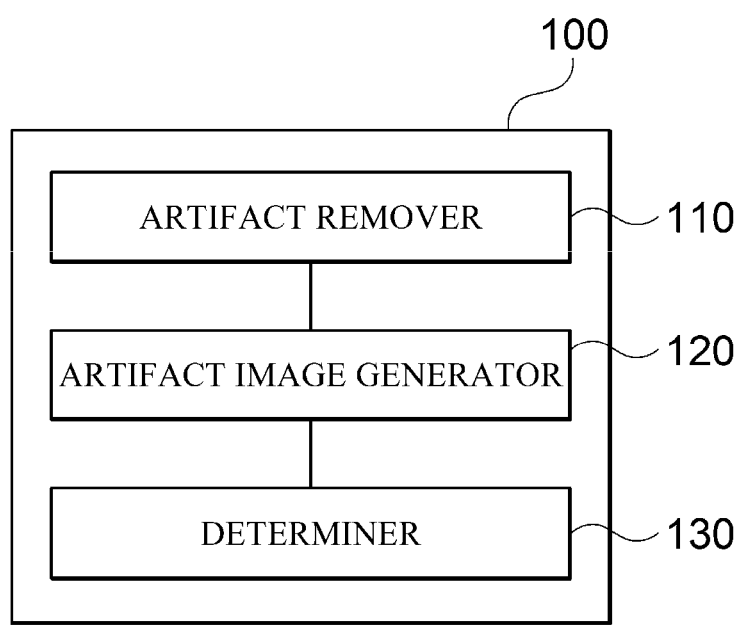
FIG. 1 is a block diagram of an apparatus for classifying fake images according to an embodiment.

FIG. 1 is a block diagram of an apparatus for classifying fake images according to an embodiment.

According to an embodiment, an apparatus 100 for classifying fake images (fake image classifying apparatus) may include an artifact remover 110, an artifact image generator 120, and a determiner 130.

According to an embodiment, the artifact refers to a micromark that is generated in a fake image during an up-sampling process inherent in a generative adversarial network (GAN) at the time of generating the image through a generative adversarial network model.

According to an embodiment, the fake image classifying apparatus 100 may determine whether an image is a fake image by using the fact that a specific artifact is continuously found in the fake image manipulated by the fake image generation model. For example, the artifact remover 110 generates an image from which the artifacts of the fake image are removed, the artifact image generator 120 generates an artifact image in which the difference between the image from which the artifacts are removed and an original image is extracted, and the determiner 130 may determine whether the artifact image is a real image or a fake image.

According to an embodiment, the artifact remover 110 may receive an input image to generate an artifact-removed image from which artifacts are removed.

According to an embodiment, the artifact remover 110 may be constructed with the generative adversarial network. For example, the artifact remover 110 is designed on the assumption that the fake image and the real image will be similar to each other when learning to remove the artifacts from the fake image. To this end, the artifact remover 110 may be constructed with a generative adversarial network including an artifact-removed image generator 111 and the artifact-removed image determiner 113.

According to an embodiment, the artifact-removed image generator 111 may be trained to easily fool the artifact-removed image determiner 113 by the generated image as an actual image, and the artifact-removed image determiner 113 may be trained to distinguish the image generated by the artifact-removed image generator 111 from the actual image.

According to an embodiment, the artifact remover 110 may include the artifact-removed image generator 111 that generates an artifact-removed image from the input image by using an artificial neural network trained to remove artifacts of the input image in the frequency domain.

According to an embodiment, the artifact-removed image generator 111 may generate a converted image by converting the input image into a frequency domain.

Figure 2:
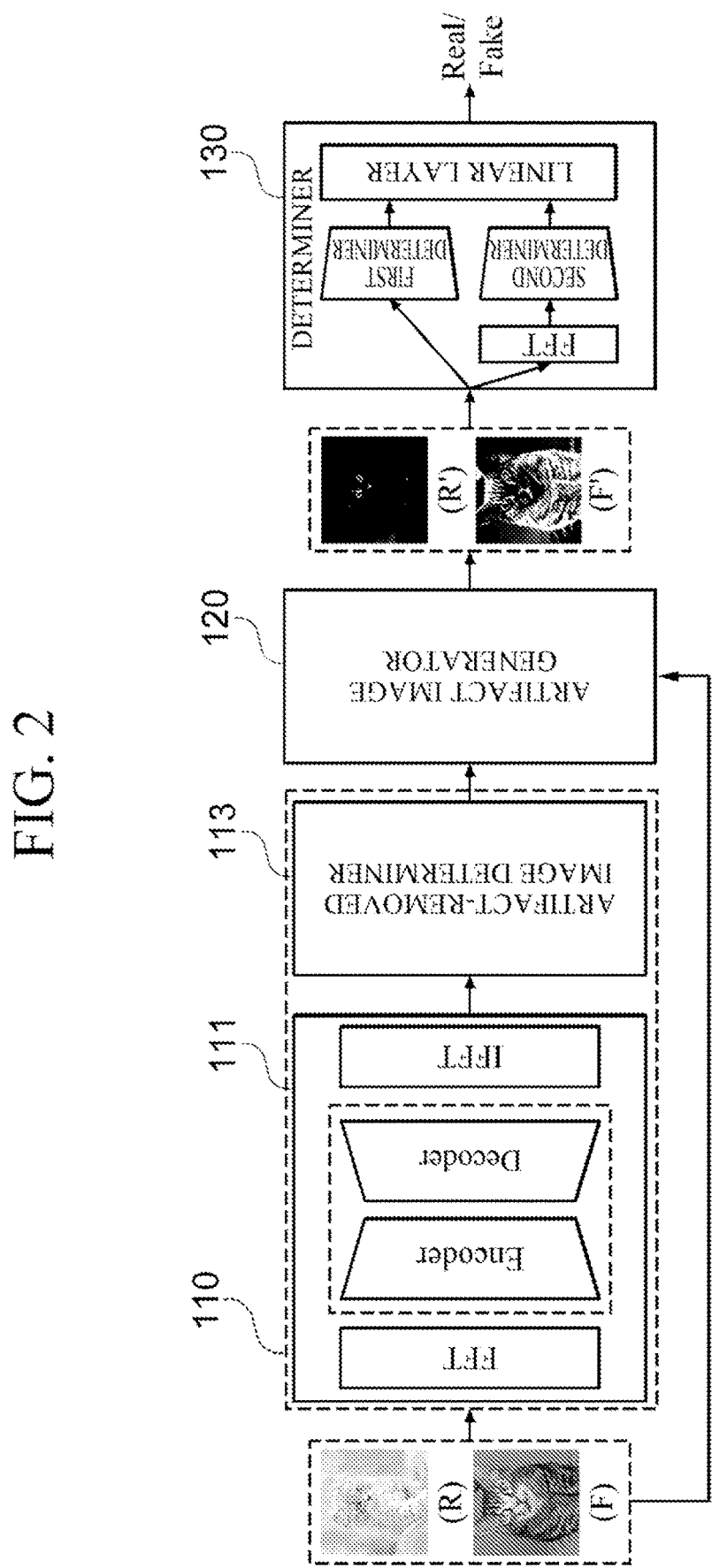
FIG. 2 is an exemplary diagram of an apparatus for classifying fake images according to an embodiment.

Referring to FIG. 2, the artifact-removed image generator 111 may receive an input image formed of at least one of a real input image R and a fake input image F, and convert the input image into a frequency domain. For example, the artifact-removed image generator 111 may convert the input image by using a fast Fourier transform (FFT).

According to an embodiment, the artifact-removed image generator 111 may remove artifacts from the converted image by using an artificial neural network. As shown in FIG. 2, the artifact-removed image generator 111 may include an artificial neural network including an encoder and a decoder. As an example, the artificial neural network may remove artifacts from the input image converted to the frequency domain.

According to an embodiment, the artifact-removed image generator 111 may be trained based on an adversarial loss function defined so that the artifact-removed image of the real input image and the artifact-removed image of the fake input image are similar.

For example, the artifact-removed image generator 111 may perform adversarial learning to generate an artifact-removed image that is difficult for the artifact-removed image determiner 113 to distinguish. Accordingly, the artifact-removed image generator 111 may define an adversarial loss function $L_{adv}$ as follows based on whether the generated artifact-generated image is determined by the artifact-removed image determiner 113 as a real image.

$$\mathcal{L}_{adv} = \mathbb{E}_{x \sim X}[\log(1-D(G(x)))] \qquad \text{[Equation 1]}$$

Here, X denotes a batch set of input images, G(x) denotes a generated artifact-removed image, and D( ) denotes a determination value (0 or 1) of whether the artifact-removed image is a real image.

According to an embodiment, the artifact-removed image generator 111 may be trained based on a normalized loss function defined so that the artifact-removed image of the real input image is similar to the real input image and the artifact-removed image of the fake input image is made close to zero.

According to an embodiment, when only the adversarial loss function is applied to training, the artifact-removed image may not preserve the real image. Accordingly, the artifact-removed image generator 111 may generate an unpredictable result, and thus a difference between the real image and the fake image may be further widened. Accordingly, since the purpose of the artifact-removed image generator 111 is to generate the artifact-removed image, it is necessary to preserve the real image and compress the artifacts of the fake image.

According to an embodiment, when the artifact-removed image generator 111 learns that the artifact-removed image of the real input image and the artifact-removed image of the fake input image are similar, the artifact-removed image of the real input image may have characteristics different from the real image. Accordingly, the artifact-removed image generator 111 needs to be trained to generate the artifact-removed image of the real input image similarly to the real input image.

On the other hand, the artifact-removed image generator 111 needs to be trained to extract artifacts as much as possible from the fake input image. Accordingly, the artifact-removed image generator 111 may be trained so that the artifact-removed image of the fake input image is as close to 0 as possible.

To this end, a normalization loss function $L_{reg}$ can be defined as follows.

$$\mathcal{L}_{reg} = \mathbb{E}_{x_r \sim X_r}[\|G(x_r) - x_r\|_2^2] + \mathbb{E}_{x_f \sim X_f}[\|G(x_f)\|_2^2] \quad \text{[Equation 2]}$$

Here, $X_r$ denotes a batch set of a real input image, and $X_f$ denotes a batch set of a fake input image.

According to an embodiment, the artifact-removed image generator 111 may generate an artifact-removed image by converting the artifact-removed converted image into an image domain.

As shown in FIG. 2, the artifact-removed image generator 111 may receive image data from which artifacts have been removed in the frequency domain and convert the received image data into the image domain through Inverse Fast Fourier Transform (IFFT).

According to an embodiment, the artifact remover 110 may include the artifact-removed image determiner 113 trained to determine whether the artifact-removed image is a real image or a fake image.

According to an embodiment, the artifact-removed image determiner 113 may receive the artifact-removed image generated by the artifact-removed image generator 111 and determine whether the received image is the artifact-removed image of the real input image. For this purpose, the loss function of the artifact-removed image determiner 113 may be defined as follows.

$$\mathcal{L}_D = \mathbb{E}_{x_r \sim X_r}[\log(D(G(x_r)))] + \mathbb{E}_{x \sim X}[\log(1 - D(G(x))) \quad \text{[Equation 3]}$$

According to an embodiment, the fake image classifying apparatus 100 may include the artifact image generator 120 that generates an artifact image by using a difference between the input image and the artifact-removed image.

Referring to FIG. 2, the artifact image generator 120 may receive an artifact-removed image from which artifacts are removed from the artifact remover 110, and may receive input images R and F. Then, the artifact image generator 120 may extract artifacts of the input images R and F by using a difference between the artifact-removed images from the input images R and F. Accordingly, the artifact image generator 120 may generate artifact images R' and F' composed of only the extracted artifacts.

According to an embodiment, the fake image classifying apparatus 100 may include the determiner 130 that receives an artifact image and determines whether the image is a real image or a fake image.

According to an embodiment, the determiner 130 may include a first determiner that determines whether an image is a real image or a fake image based on the artifact image, and a second determiner that converts the artifact image into a frequency domain and then determines whether the converted image is a real image or a fake image.

According to an embodiment, the artifact image received from the artifact image generator 120 may have few artifacts in the case of a real image and many artifacts in the case of a fake image. By using this, the determiner 130 may determine whether the input image is a real image or a fake image. In other words, the determiner 130 may detect a deepfake by determining whether an image is a real image or a fake image based on whether or not artifacts exist in the artifact image.

According to an embodiment, the determiner 130 may be constructed in a parallel structure of image/frequency to detect all artifacts found in the image domain, the frequency domain, and a combination thereof. For example, the determiner 130 may detect artifacts in the image domain through the artifact image at the first determiner, and may detect artifacts in the frequency domain after converting the artifact image into the frequency domain at the second determiner. Further, the determiner 130 may determine whether the input image is a real image or a fake image based on determination results of the first determiner and the second determiner, in a linear layer.

As an example, the determiner 130 may be trained based on a label for whether the input image is a real image or a fake image, and the loss function for this may include a cross-entropy loss as follows.

$$\mathcal{L}_C = \mathbb{E}_{(x,y) \sim (X,Y)}[y \log(C(A_G(x))) + (1-y)\log(1 - C(A_G(x)))] \quad \text{[Equation 4]}$$

Here, y means a label value for whether the image is a real image or a fake image.

Figure 3:
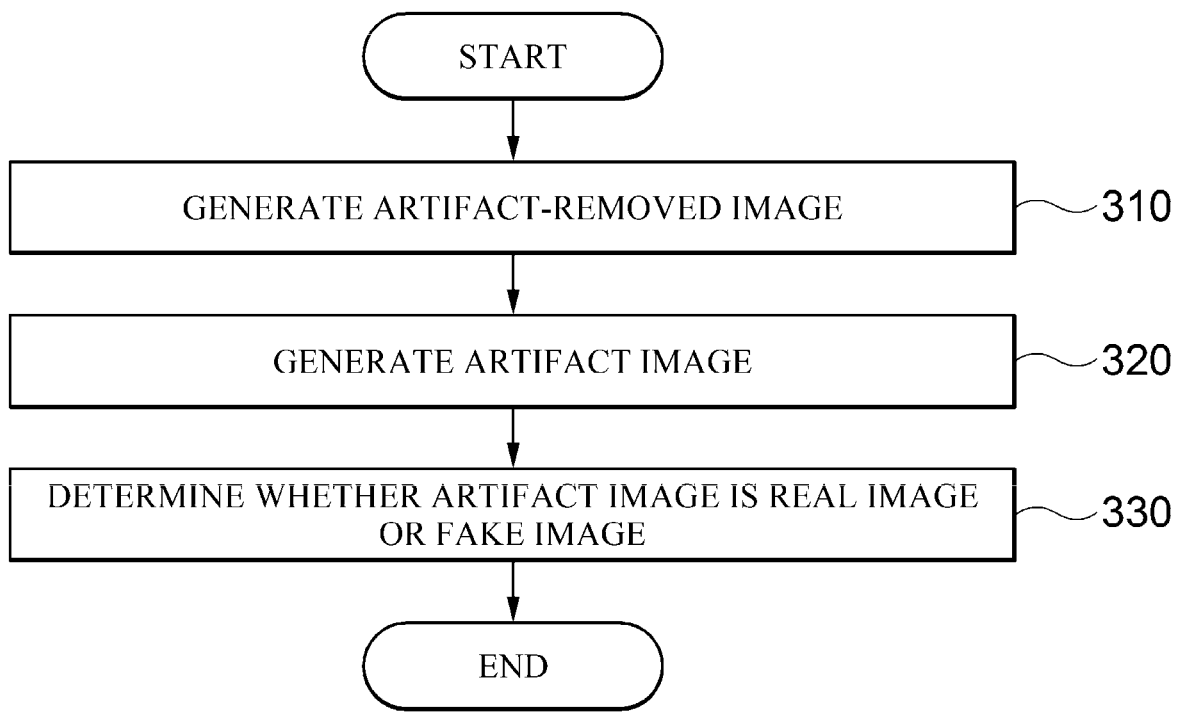
FIG. 3 is a flowchart of a method for classifying fake images according to an embodiment.

FIG. 3 is a flowchart of a method for classifying fake images according to an embodiment.

According to an embodiment, the fake image classifying apparatus may receive an input image to generate an artifact-removed image from which artifacts are removed (310).

According to an embodiment, the fake image classifying apparatus may be constructed with a generative adversarial neural network. For example, the fake image classifying apparatus is designed on the assumption that the fake image and the real image will be similar to each other when learning to remove the artifacts from the fake image. To this end, the fake image classifying apparatus may be constructed with a generative adversarial neural network including the artifact-removed image generator that generates an artifact-removed image and the artifact-removed image determiner that determines the artifact-removed image.

According to an embodiment, the artifact-removed image generator may be trained to easily fool the artifact-removed image determiner by the generated image as an actual image, and the artifact-removed image determiner may be trained to distinguish the image generated by the artifact-removed image generator from the actual image.

According to an embodiment, the fake image classifying apparatus may generate an artifact-removed image from the input image by using the artificial neural network trained to remove artifacts of the input image in the frequency domain.

According to an embodiment, the fake image classifying apparatus may generate the converted image by converting the input image into the frequency domain. For example, the fake image classifying apparatus may receive an input image formed of at least one of a real input image R and a fake input image F, and convert the input image into a frequency domain. For example, the fake image classifying apparatus may convert the input image by using a fast Fourier transform (FFT).

According to an embodiment, the fake image classifying apparatus may remove artifacts from the converted image by using an artificial neural network. For example, the fake image classifying apparatus may include an artificial neural network including an encoder and a decoder. As an example, the artificial neural network may remove artifacts from the input image converted to the frequency domain.

According to an embodiment, the fake image classifying apparatus may be trained based on an adversarial loss function defined so that the artifact-removed image of the real input image and the artifact-removed image of the fake input image are similar.

For example, the artifact-removed image generator 111 may perform adversarial learning to generate an artifact-removed image that is difficult for the artifact-removed image determiner 113 to distinguish.

According to an embodiment, the fake image classifying apparatus may be trained based on a normalized loss function defined so that the artifact-removed image of the real input image is similar to the real input image and the artifact-removed image of the fake input image is made close to zero.

According to an embodiment, when only the adversarial loss function is applied to training, the artifact-removed image may not preserve the real image. Accordingly, the fake image classifying apparatus may generate an unpredictable result, and thus a difference between the real image and the fake image may be further widened.

According to an embodiment, when the fake image classifying apparatus learns that the artifact-removed image of the real input image and the artifact-removed image of the fake input image are similar, the artifact-removed image of the real input image may have characteristics different from the real image. Accordingly, the fake image classifying apparatus needs to be trained to generate the artifact-removed image of the real input image similarly to the real input image.

On the other hand, the fake image classifying apparatus needs to be trained to extract artifacts as much as possible from the fake input image. Accordingly, the fake image classifying apparatus may be trained so that the artifact-removed image of the fake input image is as close to 0 as possible.

According to an embodiment, the fake image classifying apparatus may generate an artifact-removed image by converting the artifact-removed converted image into an image domain.

As one example, the fake image classifying apparatus may receive image data from which artifacts have been removed in the frequency domain and convert the received image data into the image domain through Inverse Fast Fourier Transform (IFFT).

According to an embodiment, the fake image classifying apparatus may determine whether the artifact-removed image is a real image or a fake image.

According to an embodiment, the fake image classifying apparatus may generate an artifact image by using a difference between the input image and the artifact-removed image (320).

According to an embodiment, the fake image classifying apparatus may extract artifacts of the input images R and F by using a difference between the artifact-removed images from the input images R and F. Accordingly, the fake image classifying apparatus may generate artifact images R' and F' composed of only the extracted artifacts.

According to an embodiment, the fake image classifying apparatus may receive an artifact image and determine whether the received image is a real image or a fake image (330).

According to an embodiment, the fake image classifying apparatus may include the first determiner that determines whether an image is a real image or a fake image based on the artifact image, and the second determiner that converts the artifact image into a frequency domain and then determines whether it is a real image or a fake image.

According to an embodiment, the artifact image generated by the fake image classifying apparatus may have few artifacts in the case of a real image and many artifacts in the case of a fake image. By using this, the fake image classifying apparatus may determine whether the input image is a real image or a fake image. In other words, the fake image classifying apparatus may detect a deepfake by determining whether an image is a real image or a fake image based on whether or not artifacts exist in the artifact image.

According to an embodiment, the fake image classifying apparatus may be constructed in a parallel structure of image/frequency to detect all artifacts found in the image domain, the frequency domain, and a combination thereof. For example, the fake image classifying apparatus may detect artifacts in the image domain through the artifact image at the first determiner, and may detect artifacts in the frequency domain after converting the artifact image into the frequency domain at the second determiner. Further, the fake image classifying apparatus may determine whether the input image is a real image or a fake image based on determination results of the first determiner and the second determiner, in a linear layer.

Figure 4:
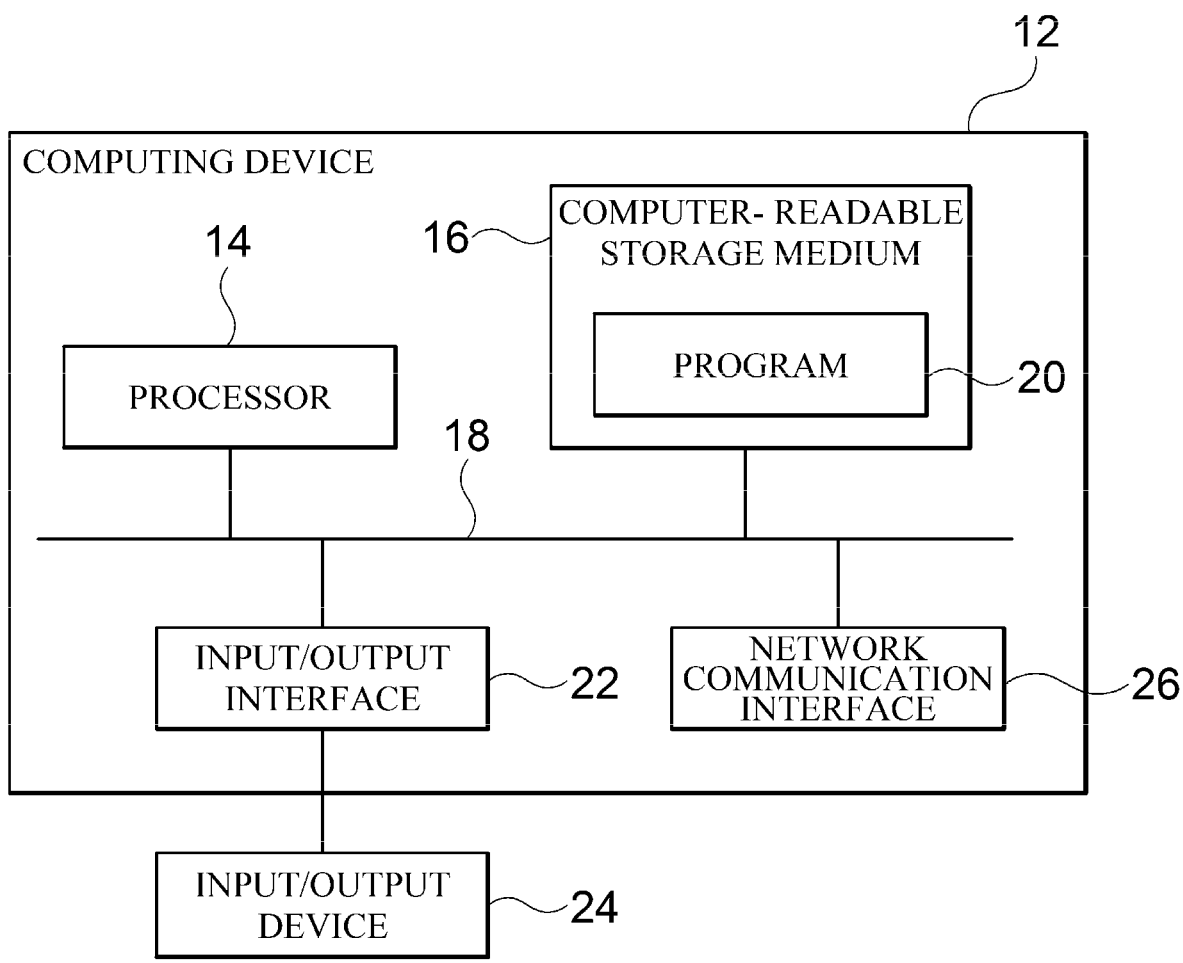
FIG. 4 is a block diagram for exemplarily illustrating a computing environment including a computing device according to an embodiment.

FIG. 4 is a block diagram for exemplarily illustrating a computing environment including a computing device according to an embodiment.

In the illustrated embodiment, each component may have different functions and capabilities in addition to those described below, and additional components may be included in addition to those described below.

The illustrated computing environment 10 includes a computing device 12. In an embodiment, the computing device 12 may be one or more components included in the fake image classifying apparatus 100. The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

According to the disclosed embodiments, it is possible to effectively extract an artifact existing in a fake image, and based on the above-mentioned fact, it is possible to solve the general problem of fake image detection.

Although the present disclosure has been described in detail through the representative embodiments as above, those skilled in the art will understand that various modifications can be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for classifying fake images comprising:
    an artifact remover configured to receive an input image to generate an artifact-removed image from which artifacts are removed;
    an artifact image generator configured to generate an artifact image by using a difference between the input image and the artifact-removed image; and
    a determiner configured to determine whether the artifact image is a real image or a fake image by receiving the artifact image,
    wherein the artifact remover comprises:
    an artifact-removed image generator configured to generate the artifact-removed image from the input image by using an artificial neural network trained to remove artifacts of the input image; and
    an artifact-removed image determiner configured to be trained to determine whether the artifact-removed image is a real image or a fake image, and
    wherein the artifact-removed image generator is further configured to be trained based on:
    an adversarial loss function defined so that an artifact-removed image of a real input image and an artifact-removed image of a fake input image are similar, and
    a normalized loss function defined so that the artifact-removed image of the real input image is similar to the real input image and the artifact-removed image of the fake input image is made close to zero.

2. The apparatus of claim 1, wherein the artificial neural network is trained to remove the artifacts of the input image in a frequency domain.

3. The apparatus of claim 2, wherein the artifact-removed image generator is further configured to:
    convert the input image into a frequency domain to generate a converted image,
    remove artifacts from the converted image by using the artificial neural network, and
    generate an artifact-removed image by converting the artifact-removed converted image into an image domain.

4. The apparatus of claim 2, wherein the artifact-removed image generator and the artifact-removed image determiner constitute a generative adversarial network (GAN).

5. The apparatus of claim 1, wherein the determiner comprises:
    a first determiner configured to determine whether an image is a real image or a fake image based on the artifact image; and
    a second determiner configured to convert the artifact image into a frequency domain and then determines whether the converted image is a real image or a fake image.

6. A method for classifying fake images comprising:
    removing artifacts by receiving an input image to generate an artifact-removed image from which the artifacts are removed;
    generating an artifact image by using a difference between the input image and the artifact-removed image; and
    determining whether the artifact image is a real image or a fake image by receiving the artifact image,
    wherein the removing of the artifacts comprises:
    generating the artifact-removed image from the input image by using an artificial neural network trained to remove artifacts of the input image; and
    determining whether the artifact-removed image is a real image or a fake image, and
    wherein the artificial neural network is trained based on:
    an adversarial loss function defined so that an artifact-removed image of a real input image and an artifact-removed image of a fake input image are similar, and
    a normalized loss function defined so that the artifact-removed image of the real input image is similar to the real input image and the artifact-removed image of the fake input image is made close to zero.

7. The method of claim 6, wherein the artificial neural network is trained to remove the artifacts of the input image in a frequency domain.

8. The method of claim 7, wherein the generating of the artifact-removed image comprises:
    generating a converted image by converting the input image into a frequency domain;
    removing artifacts from the converted image by using the artificial neural network, and
    generating the artifact-removed image by converting the artifact-removed converted image into an image domain.

9. The method of claim 7, wherein the generating of the artifact-removed image and the determining of the artifact-removed image constitute a generative adversarial network (GAN).

10. The method of claim 6, wherein the determining comprises:
    determining whether an image is a real image or a fake image based on the artifact image; and
    converting the artifact image into a frequency domain and then determining whether the converted image is a real image or a fake image.

* * * * *